May 12, 1936. C. W. SCHERER Re. 19,964

REFRIGERATING APPARATUS

Original Filed Jan. 31, 1927

Inventor
Charles W. Scherer

By Spencer Hardman & Fehr

Attorney

Reissued May 12, 1936

Re. 19,964

UNITED STATES PATENT OFFICE 19,964

REFRIGERATING APPARATUS

Charles W. Scherer, Dayton, Ohio, assignor, by mesne assignments, to Frigidaire Corporation, a corporation of Delaware Original No. 1,887,948, dated November 15, 1932, Serial No. 164,722, January 31, 1927. Application for reissue April 21, 1933, Serial No. 667,290

6 Claims. (Cl. 62—116)

This invention relates to refrigerating apparatus. It is particularly, but not exclusively, applicable to food or storage cabinets provided with air-cooled refrigerating machines.

One of the objects of the invention is to provide improved means for cooling refrigerating machines by air.

Another object is to provide a household refrigerating cabinet with improved means for circulating cooling air over its refrigerating machine.

Further objects and advantages of the present invention will be apparent from the following description, reference being had to the accompanying drawings, wherein a preferred form of embodiment of the present invention is clearly shown.

Figure 1:
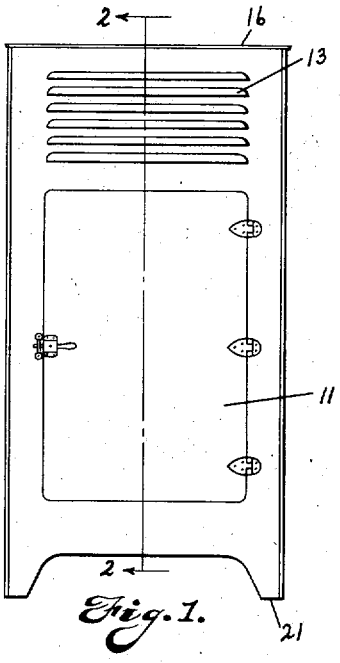
Fig. 1 is a front elevation of the household cabinet embodying the invention.
Figure 2:
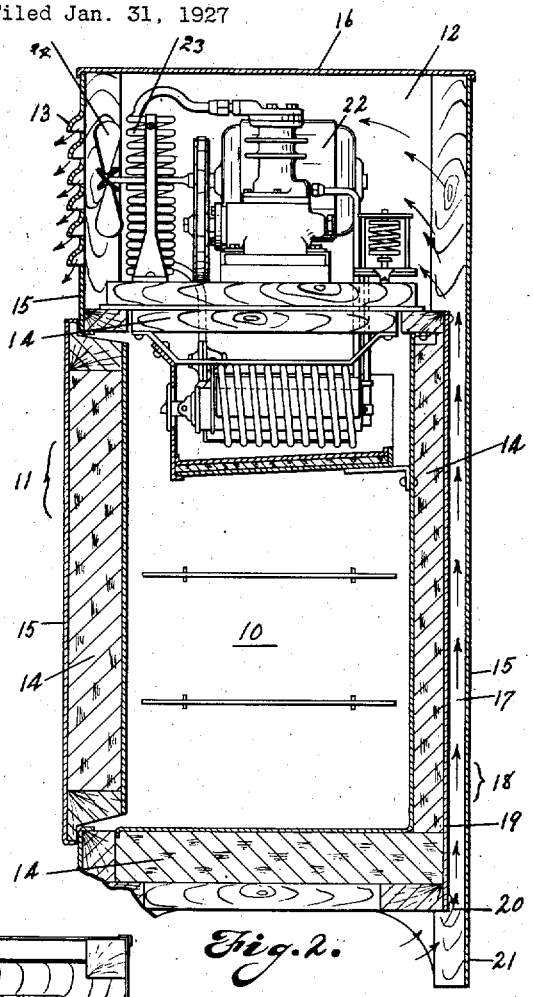
Fig. 2 is a section on the line 2—2 of Fig. 1.
Figure 3:
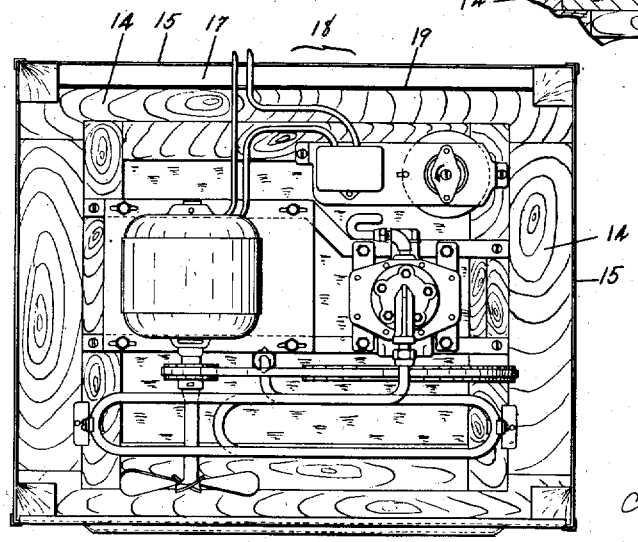
Fig. 3 is a plan view of the machine compartment with the cover removed.

Mechanical refrigerators are customarily provided with a storage compartment and a machine compartment, the latter housing a refrigerating machine for abstracting heat from the storage compartment. This heat is, in many cases, carried off by air currents and dissipated in the atmosphere. My invention contemplates more effective circulation of the cooling air in such apparatus. To this end I provide a conduit having its intake at a low level to draw cool air from the cooler layers of air in the room, and its outlet at a higher level, and place the refrigerating machine in the conduit. That is, the conduit may include the machine compartment.

Referring to the drawing, the cabinet comprises walls enclosing a cooling compartment 10, having a door 11, and a machine compartment 12 above the cooling compartment. The machine compartment may have louvres 13, to form an air outlet. Preferably the side walls are composed of insulating members 14 and impervious lining or facing members 15. The facing members of the side walls are extended beyond the insulating members thereof to form the machine compartment, which is provided with a suitable cover 16. A conduit or flue 17 is formed in the back wall 18, preferably by spacing the insulating member 14 from the facing member 15. If desired an additional facing member 19 may be provided for the insulating member to protect it from moisture.

The flue 17 has its intake 20 near the floor, and to provide for admission of sufficient air, the cabinet may be mounted on legs 21. The flue discharges into the machine compartment, thus forming with the latter a continuous conduit for the circulation of air.

The refrigerating machine includes a motor 22, condenser 23, and fan 24 driven by the motor. When the motor is running, the fan moves air through the conduit to cool the condenser and other parts of the machine, drawing air in at 20 and forcing it out at 13.

This arrangement has various advantages. By placing the outlet of the conduit at a point remote from the inlet, contamination of the cool air supply by expelled warm air is prevented. The intake is at the level of the coldest air in the room, thus providing the maximum cooling effect. Furthermore the location of the outlet above the level of the inlet permits the heat of the machine to induce a natural circulation in the conduit when the motor and fan stop. This further cools the machine.

While the form of embodiment of the present invention as herein disclosed, constitutes a preferred form, it is to be understood that other forms might be adopted, all coming within the scope of the claims which follow.

What is claimed is as follows:

1. In a refrigerating apparatus a cabinet having a plurality of side walls enclosing a refrigerating compartment and a machine compartment above the refrigerating compartment, the side walls including insulating members and facing members, a facing member spaced from one of said insulating members to provide a conduit for cooling air communicating with the machine compartment and having its inlet near the bottom of the cabinet.

2. In a refrigerating apparatus, a plurality of vertical walls comprising insulating members and facing members, the insulating members enclosing a refrigerating compartment and certain of the facing members being extended beyond the insulating members to form a machine compartment above the refrigerating compartment, a facing member spaced from one of said insulating members to provide a conduit for cooling air communicating with the machine compartment and having its inlet near the bottom of the cabinet.

3. Refrigerating apparatus comprising in combination a cabinet having side walls including insulating members and facing members, the insulating members forming a refrigerating compartment and certain of the facing members being extended above the insulating members to form a machine compartment, a facing member spaced from one of said insulating members to provide a conduit for conducting cooling air from a point near the bottom of the cabinet into the machine compartment; and a unitary refrigerating apparatus including an insulating wall forming a partition between the cooling compartment and machine compartment, an evaporating unit secured to the underside of said partition, and an air-cooled condensing unit secured to the upper side of said partition, said condensing unit including a fan for drawing air through said conduit.

4. In refrigerating apparatus, a plurality of vertical walls comprising insulating members and facing members, the insulating members enclosing a cooling compartment, and certain of the facing members being extended beyond the insulating members to form a machine compartment, a facing member spaced from one of said insulating members to provide a conduit for cooling air communicating with the machine compartment.

5. A refrigerating apparatus comprising, a cabinet, said cabinet including a plurality of upright walls and other adjoining walls defining a food storage compartment and a machine compartment above the food storage compartment, the upright walls surrounding said food storage compartment comprising insulating portions and facing members overlying the insulating portions, a facing member spaced from one of the facing members of one of said upright walls to provide an air flue therebetween, and said air flue communicating with the machine compartment and extending to the lower portion of said cabinet and opening exteriorly of the cabinet at its lower end.

6. A refrigerating apparatus comprising, a cabinet, said cabinet including a plurality of upright walls and other adjoining walls defining a food storage compartment and a machine compartment above the food storage compartment, said machine compartment being provided with an air inlet opening and an air outlet opening, the upright walls surrounding said food storage compartment comprising insulating portions and facing members overlying the insulating portions, a facing member spaced from one of the facing members of one of said upright walls to provide an air flue therebetween, and said air flue communicating with the air inlet opening of said machine compartment and extending to a point below the plane of the air outlet opening of said machine compartment and having its lower end opening exteriorly of the cabinet.

CHARLES W. SCHERER.